United States Patent
Srivastava

(10) Patent No.: US 12,513,228 B2
(45) Date of Patent: Dec. 30, 2025

(54) FRAMEWORK FOR GATEWAY FEATURE EXTRACTION FROM COMMUNICATION DATA

(71) Applicant: Ayla Networks, Inc., Milpitas, CA (US)

(72) Inventor: Rachna Srivastava, Saratoga, CA (US)

(73) Assignee: Ayla Networks, Inc., Milpitas, CA (US)

( * ) Notice: Subject to any disclaimer, the term of this patent is extended or adjusted under 35 U.S.C. 154(b) by 167 days.

(21) Appl. No.: 17/481,199

(22) Filed: Sep. 21, 2021

(65) Prior Publication Data

US 2023/0089836 A1 Mar. 23, 2023

(51) Int. Cl.
*H04L 69/18* (2022.01)
*H04L 69/06* (2022.01)
*H04W 88/16* (2009.01)

(52) U.S. Cl.
CPC .............. *H04L 69/18* (2013.01); *H04L 69/06* (2013.01); *H04W 88/16* (2013.01)

(58) Field of Classification Search
CPC ......... H04L 69/18; H04L 69/06; H04L 67/12; H04L 63/0428; H04L 12/282; H04L 67/34; H04L 41/0803; H04L 41/0893; H04L 41/0894; H04L 67/30; H04L 67/561; H04L 67/566; H04W 88/16
USPC ................................ 709/217–219, 224, 228
See application file for complete search history.

(56) References Cited

U.S. PATENT DOCUMENTS

| | | | | |
|---|---|---|---|---|
| 8,931,073 B2 * | 1/2015 | Huang | .................... | H04L 45/04 |
| | | | | 726/11 |
| 9,203,741 B1 * | 12/2015 | Martini | .................... | H04L 45/30 |
| 2012/0271897 A1 * | 10/2012 | Dollar | .................... | H04L 51/066 |
| | | | | 709/206 |
| 2016/0043684 A1 * | 2/2016 | Harif | .................... | H02J 3/38 |
| | | | | 700/287 |
| 2017/0099353 A1 * | 4/2017 | Arora | .................... | H04W 4/70 |
| 2017/0272979 A1 * | 9/2017 | Lee | .................... | H04B 1/10 |
| 2020/0136975 A1 * | 4/2020 | Arora | .................... | H04L 41/147 |
| 2020/0382361 A1 * | 12/2020 | Chandrasekhar | ........ | G06N 5/01 |
| 2021/0120393 A1 * | 4/2021 | Jensen | ................ | H04L 65/1069 |
| 2021/0204152 A1 * | 7/2021 | Vasudevan | ........... | G06N 3/0475 |
| 2022/0086529 A1 * | 3/2022 | Gowda | ................ | H04N 21/251 |
| 2023/0089836 A1 * | 3/2023 | Srivastava | .............. | H04L 69/18 |
| | | | | 709/224 |

* cited by examiner

*Primary Examiner* — Jerry B Dennison
(74) *Attorney, Agent, or Firm* — Lowenstein Sandler LLP

(57) ABSTRACT

A computing device receives a first communication data associated with a communication connection between a gateway device and an internet service provider; determines a communication protocol associated with the communication connection, wherein the communication protocol comprises a plurality of communication features; identifies a data extraction specification associated with the communication protocol, the data extraction specification comprising an instruction identifying a first communication feature of the plurality of communication features to be extracted from the first communication data; analyzes the first communication data using the data extraction specification; and generates a first extracted data based on the analysis, the first extracted data comprising the first communication feature specified in the data extraction specification.

20 Claims, 7 Drawing Sheets

FRAMEWORK FOR GATEWAY FEATURE EXTRACTION FROM COMMUNICATION DATA

BACKGROUND

Many modern appliances, consumer devices, and other devices include embedded systems that are configured to perform one or more dedicated functions for a device. Often, these devices are connected to the Internet via a customer-premises/customer-provided equipment (CPE) device, or "gateway device", that is located at an Internet service subscriber's premises and is connected with an Internet Service Provider (ISP). Management and/or configuration of a gateway device by an ISP can be performed by examining the communication data sent from the gateway device to the ISP.

BRIEF DESCRIPTION OF THE DRAWINGS

Reference will now be made to the accompanying drawings showing example embodiments of the present application.

DETAILED DESCRIPTION OF EMBODIMENTS

Figure 1:
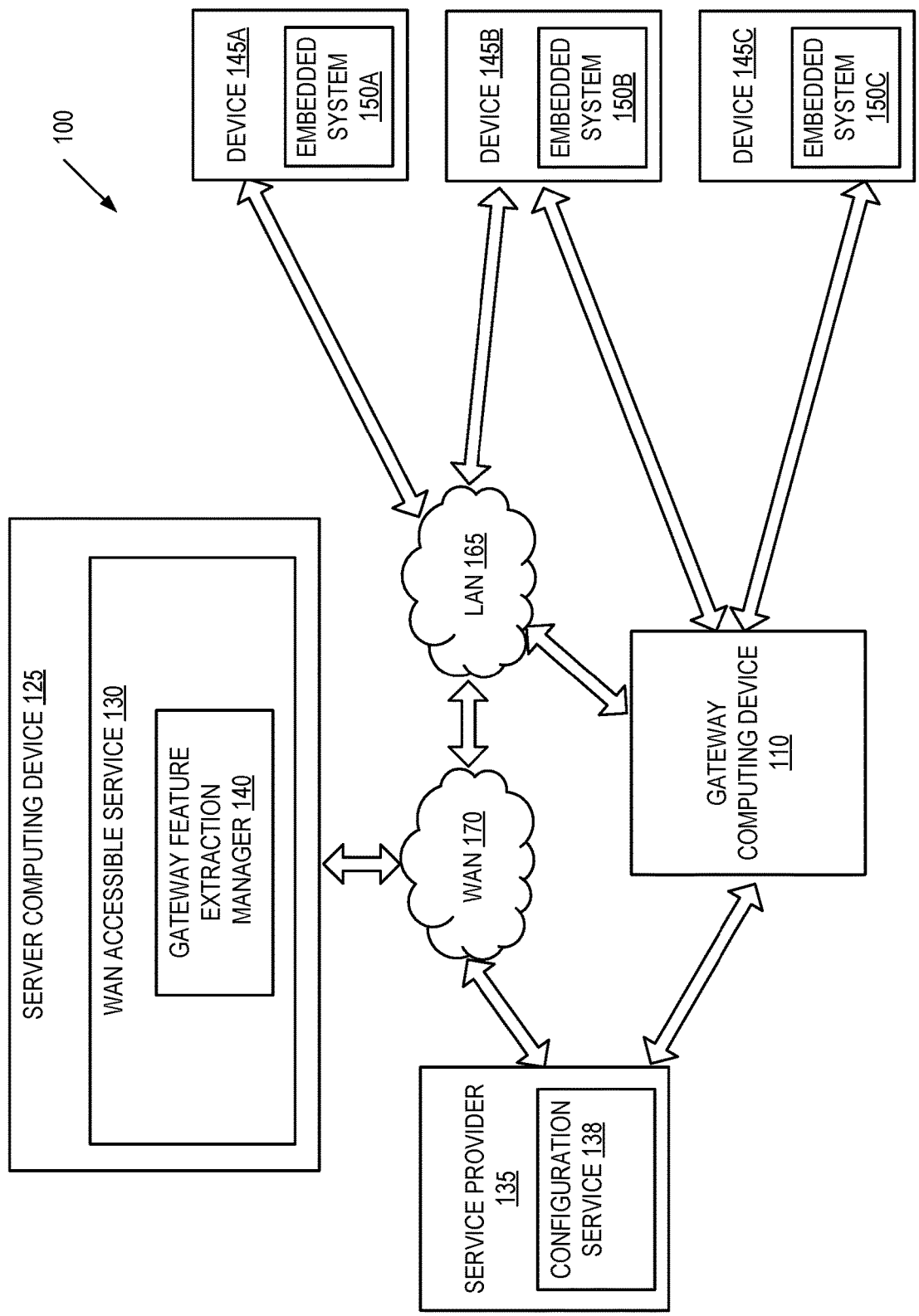
FIG. 1 is a block diagram depicting an example network architecture, in accordance with some embodiments of the present disclosure.

Embodiments described herein are directed an efficient framework for gateway feature extraction from communication data. Devices with embedded systems (e.g., Internet of Things (IoT) enabled devices, Internet accessible devices, etc.) can communicate with cloud computing environments or other Internet accessible server systems via gateway devices that manage accessibility to the internet for the connected device(s). The gateway device can communicate with an ISP using a particular communication configuration protocol that specify the sequence, format, and/or content of network communication messages as well as the configuration parameters, settings, etc. of the device. These elements of the communication configuration protocol are often referred to as communication "features".

Conventional systems allow the ability to manage and/or configure gateway devices by analyzing the features present in communication data for a particular gateway device (or class of devices). For example, by examining particular features present in communication data for a device, an ISP may be able to determine whether to adjust settings for the device to improve communications between the device and the ISP, the device and other Internet accessible services, the device and other locally connected devices, or the like. This functionality, however, often involves examining a small number of features from a large amount of communication data passed between the gateway device and the ISP.

Some conventional systems attempt to mitigate the amount of data examined and/or stored by implementing ad hoc extraction techniques that are specifically directed to examining a particular problem. Thus, any extraction logic that is implemented in real-time communications is often deployed to address a specific issue. Any modifications to the features examined, extracted, or stored would involve redevelopment and redeployment of the extraction logic. This can lead to extended deployment time in a deployment pipeline as well as significant increases in development resources involved in making changes to the extraction logic. Moreover, since this additional development can take more time to deploy, conventional systems are often rendered less flexible when responding to observed error conditions within a network, resulting in significant increases in communication error rates as well as significant decreases in communication efficiency and availability.

Aspects of the present disclosure remedy the above noted and other deficiencies by implementing a gateway feature extraction manager to facilitate an efficient framework for gateway feature extraction from communication data. In various implementations, the gateway feature extraction manager can be configured such that it is agnostic to protocol and features of interest within communication data passed between a gateway device and ISP. The gateway feature extraction manager can utilize a configuration specification that includes the applicable protocol communication layout as well as instructions that indicate which features to extract from received communication data. In one embodiment, this includes receiving communication data from the gateway device, and determining the protocol associated with the communication connection. The gateway feature extraction manager can then identify the data extraction specification associated with the communication protocol and analyze the communication data using the identified specification. Subsequently, the gateway feature extraction manager can extract the features identified in the data extraction specification, generating extracted data that can be stored and/or subsequently analyzed.

Aspects of the present disclosure provide advantages over conventional systems by significantly reducing the resources involved in deploying updates to feature extraction. By utilizing the data extraction specification to direct the gateway feature extraction manager, updates to extracted features can be deployed in real-time "on the fly" to address new extraction requirements associated with newly detected types of communication anomalies. This, in turn, can significantly improve system performance since modifications to the extraction process can be made without additional time in the development/deployment lifecycle, which can reduce exposure to communication anomalies and potential error conditions.

Referring now to the figures, FIG. 1 is a block diagram depicting an example network architecture 100 including remotely accessible embedded systems (e.g., of IoT devices) and computing devices that interact with the embedded systems. The network architecture 100 includes one or more devices 145 and a gateway computing device 110 connected to a local area network (LAN) 165. The devices 145 are devices with embedded systems 150 (e.g., IoT devices), and may include, for example, electrical appliances such as refrigerators, ovens, washers, driers, dishwashers, thermostats, alarms, air conditioners, ceiling fans, televisions, radios, receivers, amplifiers, and so forth. The devices 145 may also include consumer devices such as digital watches, music players, game consoles, digital cameras, printers, and so forth. Other examples of devices 145 include stationary devices such as HVAC systems, traffic lights, factory controllers, signs, electronic billboards, sprinkler systems, and irrigation control systems, as well as medical devices. Devices 145 may also be any other type of device that includes an embedded system 150A-C.

An embedded system 150A-C is a class of computing device that is embedded into another devices 145A-C as one component of the devices 145A-C. The devices 145A-C typically also includes other hardware, electrical and/or mechanical components that may interface with the embedded system. Embedded system 150A-C is typically configured to handle a particular task or set of tasks, for which the embedded system 150A-C may be optimized. Accordingly, the embedded system 150A-C may have a minimal cost and size as compared to general computing devices.

The embedded system 150A-C may include a communication module (not shown) that enables the embedded system 150A-C (and thus the devices 145A-C) to connect to the LAN 165, or alternatively, directly to gateway computing device 110. The communication module may be configured to manage security, manage sessions, manage communications with external devices, and so forth. In one embodiment, the communication module is configured to communicate using Wi-Fi®. Alternatively, the communication module may be configured to communicate using Cellular (3G, 4G, 5G, NB-IoT), LoRAWAN, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

The LAN 165 may include a router, switch, bridge or other network device (not shown) that enables communication between multiple devices (e.g., gateway computing device 110, etc.) connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi® transceiver.

Some embedded systems 150 may not support any of the communication types supported by the network device. For example, devices 145A-C may support Zigbee®, Bluetooth, or the like. To enable such devices to connect to the LAN 165, the LAN 165 may include a gateway device 110 connected to the network device via one of the connection types supported by the network device (e.g., via Ethernet or Wi-Fi®). The gateway device 110 may additionally support other communication protocols such as Zigbee®, PLC and/or Bluetooth, and may translate between supported communication protocols. Accordingly, some devices 145 may connect to the LAN through the gateway device 110.

A gateway is a network node that connects two networks using different protocols together. Gateway device 110 can be a customer-premises/customer-provided equipment (CPE) device that is located at an Internet service subscriber's premises and is connected with an internet service provider. A CPE can include a hub, a relay, a bridge, a router, a network switch, a cable modem, a digital subscriber line (DSL) modem, a smart home hub, a wired router, a wireless access point, a desktop computer, or the like. Additionally, any of devices 145 can be a CPE. Any of the CPE devices can communicate with service provider 135 for the purposes of establishing access to WAN 170 as well as to perform configuration operations on the applicable CPE device in order to maintain stable communications with service provider 135.

Gateway device 110 may use hardware and/or firmware to perform gateway operations (e.g., translating messages between network protocols). The gateway device 110 may translate between two or more different network protocols (e.g., between Bluetooth® and TCP/IP, between Zigbee® and TCP/IP, and so on). The gateway device 110 may contain hardware modules that connect to multiple different types of networks, and may additionally include hardware modules, firmware modules and/or software modules that translate data (e.g., packets) between the different network protocols. Optionally, some stationary computing devices (not shown) such as desktop computers, routers, etc. may include a gateway application that enables the gateway device 110 to act as a software gateway.

The LAN 165 is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The WAN 170 may include or connect to service provider 135. Service provider 135 can include any Internet Service Provider (ISP) that provides the gateway computing device 110 with access to WAN 170 (e.g., Verizon®, Xfinity®, AT&T®, Sprint®, etc.). Service provider 135 can include one or more server computing devices to facilitate access to WAN 170. Service provider 135 can include configuration service 138 that is responsible for configuring and/or managing communication with gateway computing device 110 and/or devices 145. In various implementations, configuration service 138 can establish a communication connection with the gateway computing device 110 to facilitate connectivity with WAN 170 as well as perform configuration operations on gateway computing device 110 to maintain stable communications with service provider 135.

In various implementations, the communication connection between the gateway device 110 and the service provider 135 can utilize (or be associated with) a communication protocol for management of the gateway device 110 (or other CPE) communicating with the service provider 135, as well as any additional devices associated with the gateway (or other CPE) (e.g., devices 145A-C). For example, the communication connection may utilize the Technical Report 069 (TR-069) technical specification application protocol for remote management and provisioning of a CPE device connected to an ISP. Alternatively, the communication connection may utilize a different protocol.

The communication protocol can specify the type of data that can be passed between the service provider 135 and the gateway device 110 using the communication connection. In other words, the protocol can specify one or more communication "features" for the communication connection between service provider 135 and the gateway device 110. In some instances, the communication features can include device attributes, device settings, configuration settings, communication connection information, or other types of data elements associated with the gateway device 110 (or 145A-C). Additionally or alternatively, the communication features can include information associated with the communication connection itself.

The WAN 170 may additionally include or connect to server computing device 125. The server computing device 125 may include a physical machine and/or a virtual machine hosted by a physical machine. The physical machine may be a rackmount server, a desktop computer, or other computing device. In one embodiment, the server computing device 125 can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device 125 hosts a WAN accessible service 130, which may be a web based service and/or a cloud service (e.g., a web based service hosted in a cloud computing platform). The WAN accessible service 130 may maintain a session (e.g., via a continuous or intermittent connection) with the embedded system 150A-C. Alternatively, the WAN accessible service 130 may periodically establish sessions with the embedded system 150A-C. Via a session with an embedded system 150A-C, WAN accessible service 130 may issue commands to the embedded system and/or receive status updates from the embedded system. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

Status updates received from the embedded system 150A-C may identify values or states of some or all detectable parameters of devices 145A-C that the embedded system 150A-C is included in. Such values or states may change based direct user interaction with the devices. Such values or states may also change responsive to commands sent to the embedded system 150A-C by the WAN accessible service 130 and/or by computing device 110. By maintaining or periodically establishing sessions with the embedded systems 150, the WAN accessible service 130 may maintain up-to-date information on the states of the devices 145A-C. In some implementations, the status updates received from embedded system 150A-C can include device related information associated with devices 145A-C such as a unique identifier associated with the device (e.g., a specific device serial number (DSN)), the version number of a firmware component installed on embedded system 150A-C, or the like. WAN accessible service may use the status updates to determine when the firmware installed on embedded system 150A-C becomes outdated and is in need of update. This may occur when the firmware is updated to provide enhanced capabilities, to correct software errors, to replace expired encryption certificates, or the like.

The WAN accessible service 130 may additionally maintain a session (e.g., via a continuous or intermittent connection) with remote control application 120 of computing device 110. Via a session with remote control application 120, WAN accessible service 130 may receive the device related information described above in instances when embedded system 150A-C is unable to connect directly to WAN accessible service 130. In instances where the embedded system 150A-C cannot connect directly to WAN accessible service 130 (e.g., as a result of first time use of devices 145A-C, due to a problem with the version of the firmware component installed on embedded system 150A-C, etc.), WAN accessible service may use the session with remote control application 120 as a proxy for communicating with, and delivering firmware updates to, embedded system 150A-C.

In various implementations, a communication session between computing device 110 and WAN accessible service 130 can be conducted in accordance with a communication protocol associated with the activities of device 110. The communication protocol can specify a set of communication rules and/or sequence of communication messages for providing authentication and/or authorization of the device 110 to communicate with WAN accessible service 130. Additionally, the communication protocol can specify the types of communication messages and content of communication messages for the communication session. The communication protocol can specify how the device 110 authenticates itself with WAN accessible service 130, how device 110 sends notifications to WAN accessible service 130, how device 110 sends/receives data points to/from WAN accessible service 130 related to sensor data, device state, and/or device properties, how device 110 sends/receives device control commands to/from WAN accessible service 130, or other types and/or sequences of communication data.

In some instances, the communication protocol for a device 110 may be associated with a device type for the device. For example, the communication protocol for a thermostat that includes an embedded system can specify a particular method of authentication and data exchange. Similarly, the communication protocol for a ceiling fan that includes an embedded system can specify a different method of authentication and data exchange. In various implementations, each distinct device type or class of devices can utilize a specific sequence of messages for the transactions performed by that device type or class.

In an illustrative example, a communication protocol can specify that the message sequence can include an authorization request sent from device 110 to WAN accessible service 130, an authorization approval sent from WAN accessible service 130 to device 110, a data point message (e.g., a message that includes a temperature measurement in the case of a thermostat) sent from device 110 to WAN accessible service 130, and an acknowledgment message from WAN accessible service 130 to device 110 that closes the transaction. Other sequences of messages can be used for various device types and for various communication purposes (e.g., control commands to change device state of device 110, different types of messages for different types of sensors, etc.).

In some implementations, WAN accessible service 130 can include gateway feature extraction manager 140 to facilitate an efficient framework for extracting features from communication data associated with a communication connection between service provider 135 and gateway computing device 110. As noted above, the protocol associated with the connection between service provider 135 and gateway computing device 110 for managing the configuration of gateway computing device 110 can include communication features (e.g., configuration settings, data elements, etc.). In some situations, service provider 135 can make configuration decisions for gateway computing device 110 based on the features observed in the communication data. For example, by examining the features present in the communication data, the service provider 135 can determine whether to perform configuration adjustments to improve communications with a particular gateway computing device 110 (or one of its associated devices 145A-C). Additionally, by analyzing the communication features of previous communications sessions where errors were detected (e.g., communication failures, dropped packets, communication slow down) that involved remedial action to correct the error, newly received communication features can be analyzed to determine if similar conditions are present in the newly received data.

Gateway feature extraction manager 140 can facilitate extraction of particular features of interest from the communication data to provide this type of functionality. In various implementations, gateway feature extraction manager 140 can receive communication data associated with the communication connection between gateway computing device 110 and service provider 135. In some instances, gateway feature extraction manager 140 can receive the communication data from service provider 135. Alternatively, service computing device 125 can be positioned in between service provider 135 and gateway computing device 110 in WAN 170. Thus, gateway feature extraction manager 140 can receive the communication data directly from gateway computing device 110 and pass the data to service provider 135. In other implementations, an additional component (e.g., switch, bridge, data replicator, etc.) can be positioned in WAN 170 between gateway computing device 110 and both service provider 135 and service computing device 125. In this instance, the communication data can be sent to both service provider 135 and gateway feature extraction manager 140 at approximately the same time.

Once the data has been received, gateway feature extraction manager 140 can determine the communication protocol associated with the connection between service provider 135 and gateway computing device 110. Once the protocol has been determined, gateway feature extraction manager 140 can identify a data extraction specification associated with the protocol. As discussed in further detail below with respect to FIG. 2, the data extraction specification can include information associated with the protocol specification (e.g., the communication feature layout, etc.) as well as information associated with communication features of interest that are to be extracted for further analysis and/or storage. For example, should the service provider 135 want to track a small subset of the available communication features in the protocol specification, the data extraction specification can include instructions that cause gateway feature extraction manager 140 to examine and/or extract only those features rather than every feature in the received communication data.

Gateway feature extraction manager 140 can then analyze the received communication data using the identified data extraction specification. In some implementations, the data extraction specification can include instructions to extract one or more specific features from the communication data. Alternatively, the data extraction specification can include instructions to extract a range of features from the communication data. Additionally, the data extraction specification can include additional instructions to cause gateway feature extraction manager 140 to perform data transformation operations on the extracted features. For example, if a date/timestamp is received in the communication data in a non-standard format (e.g., GMT, etc.), the data extraction specification can include instructions that cause gateway feature extraction manager 140 to reformat and/or normalize the data into a standard format (e.g., ET, PT, etc.).

Subsequently, gateway feature extraction manager 140 can generate extracted data based on the analysis performed on the received communication data, where the extracted data includes the features of interest that have been extracted (and transformed if applicable) from the received communication data. Gateway feature extraction manager 140 can then repeat the above process for any subsequently received communication data from gateway computing device 110. Although for simplicity of illustration a single gateway computing device 110 has been depicted in FIG. 1, in other implementations, gateway feature extraction manager 140 can manage the communication data for multiple gateway computing devices and/or multiple service providers and communication protocols. In some implementations, a single instance of gateway feature extraction manager 140 can be configured to manage multiple connections. Alternatively, multiple instances of gateway feature extraction manager 140 can be instantiated, where each instance manages a separate connection, protocol, or service provider.

In some implementations, as noted above, gateway feature extraction manager 140 can perform additional analysis of the extracted data to monitor the gateway computing device 110 for the presence of an error condition that can be detected in the communication data. In such instances, gateway feature extraction manager 140 can compare the extracted features of the received communication data with a data store of stored extraction features that are known to be associated with error conditions. Responsive to determining that the newly received data indicates the presence of an error condition (or indicates an error condition may be imminent), gateway feature extraction manager 140 can perform an error correction action for the applicable gateway computing device 110.

An example of a WAN accessible service with an associated gateway feature extraction manager is described in further detail below with respect to FIG. 2.

Figure 2:
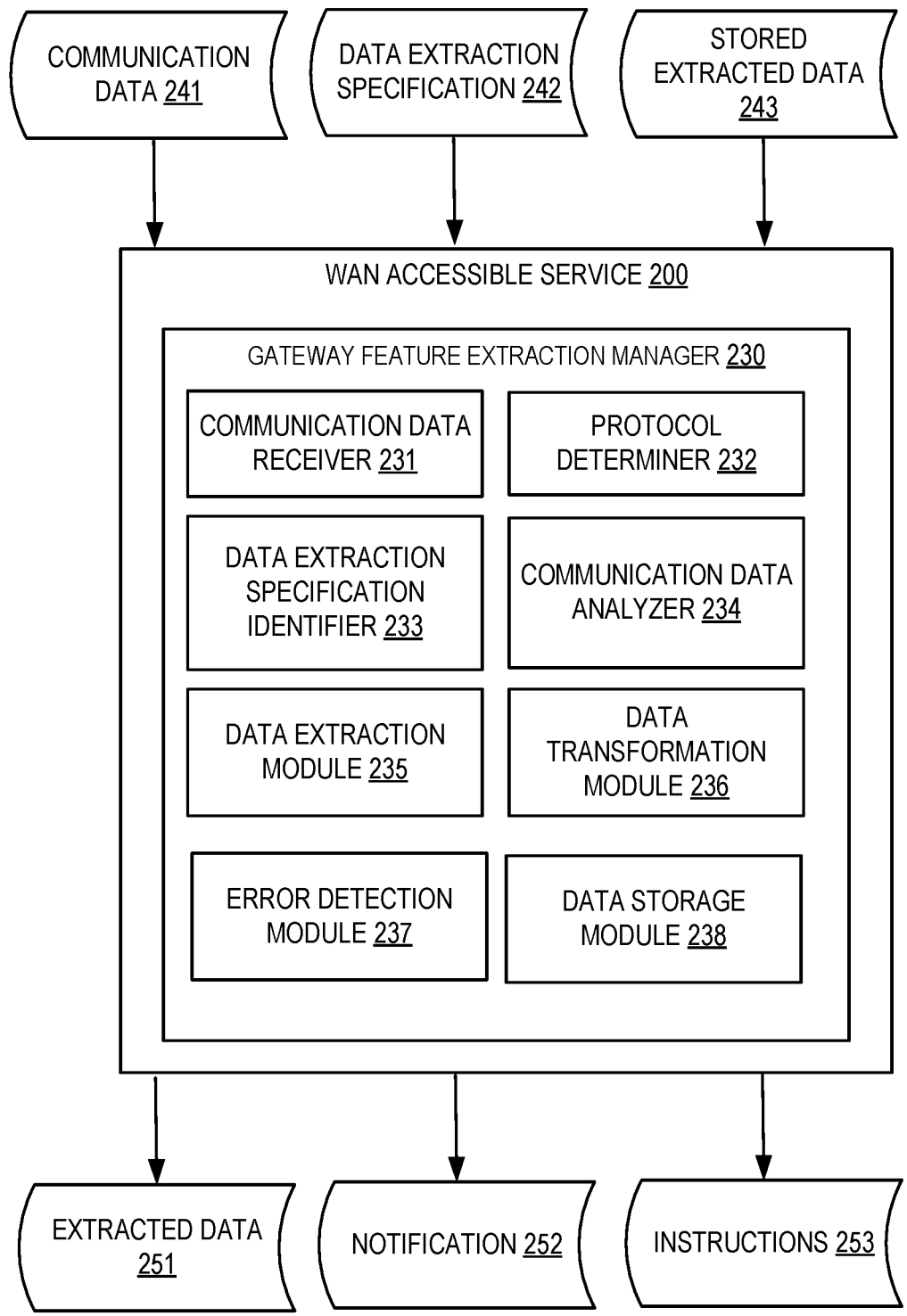
FIG. 2 is a block diagram of an example embodiment of a wide area network (WAN) accessible service that includes a gateway feature extraction manager for facilitating an efficient framework for gateway feature extraction, in accordance with some embodiments of the present disclosure.

FIG. 2 is a block diagram of an example embodiment of a WAN accessible service 200, which in one embodiment corresponds to WAN accessible service 130 of FIG. 1. WAN accessible service 200 can include a gateway feature extraction manager 230, which in one embodiment corresponds to gateway feature extraction manager 140 of FIG. 1, to facilitate a flexible framework for gateway feature extraction. In some implementations, gateway feature extraction manger 230 can include communication data receiver 231, protocol determiner 232, data extraction specification identifier 233, communication data analyzer 234, data extraction module 235, data transformation module 236, error detection module 237, and data storage module 238. Alternatively, the functionality of one or more of communication data receiver 231, protocol determiner 232, data extraction specification identifier 233, communication data analyzer 234, data extraction module 235, data transformation module 236, error detection module 237, and data storage module 238 can be combined into a single module or divided into multiple sub-modules.

Communication data receiver 231 is responsible for receiving communication data (e.g., communication data 241) associated with a communication connection between a gateway device (e.g., gateway computing device 110 of FIG. 1) and an internet service provider (ISP) (e.g., service provider 135 of FIG. 1). As noted above, the internet service provider can be any provider of accessibility to the internet for the gateway device. Also as noted above, the gateway device can be a customer-premises/customer-provided equipment (CPE) device that is located at an internet service subscriber's premises and is connected with an internet service provider. A CPE can include a router, network switch, cable modem, digital subscriber line (DSL) modem, smart home hub, wired router, wireless access point, or the like.

In various implementations, WAN accessible service 200 is present outside of or otherwise separated from the communication connection between the ISP and the gateway device. In such instances, the ISP can receive the communication data from the gateway device and forward the data to wan accessible service 200. WAN accessible service 200 can subsequently invoke communication data receiver 231 to receive the data. In other implementations, wan accessible service 200 can be positioned within the communication connection between the ISP and the gateway device, acting as an intermediary point within the connection. In such instances, WAN accessible service 200 can invoke communication data receiver 231 to receive the data as well as forward the data to the ISP. In other implementations, the communication connection can include a separate component that receives the communication data from the gateway device and sends it to both the ISP and the WAN accessible service 200 at approximately the same time. In some implementations, the communication data can be received as real-time streaming data (e.g., as communications are happening between the ISP and gateway device). Alternatively, the communication data can be received as individual communication messages that are received at a point in time after the communication has occurred. For example, the ISP can receive the communication data from the gateway device, store the data, and at some later point in time, forward the data to the WAN accessible service.

Protocol determiner 232 is responsible for determining a communication protocol associated with the communication connection. The communication connection between the gateway device and the ISP can utilize (or be associated with) a communication protocol for management of the gateway device (or other CPE) communicating with the ISP, as well as any additional devices associated with the gateway (or other CPE) (e.g., devices 145A-C of FIG. 1). For example, the communication connection may utilize the Technical Report 069 (TR-069) technical specification application protocol for remote management and provisioning of a CPE device connected to an ISP. Alternatively, the communication connection may utilize a different protocol.

In various implementations, the communication protocol can specify the type of data that can be passed between the ISP and the gateway device using the communication connection. In other words, the protocol can specify one or more communication features for the communication connection between the ISP and the gateway device. In some instances, the communication features can include device attributes, device settings, configuration settings, communication connection information, or other types of data elements associated with the gateway device (or devices that are connected to the gateway device). Additionally or alternatively, the communication features can include information associated with the communication connection itself.

In some implementations, protocol determiner 232 can determine the protocol by examining information included in the communication data received by communication data receiver 231 (from the ISP, gateway device, intermediary device, etc.). For example, a particular data element or feature of the protocol may include an identifier within the communication data that identifies the protocol used. In other implementations, the gateway feature extraction manager 230 may be configured to analyze a particular protocol. In such instances, when the gateway feature extraction manager 230 is initialized at start-up, a configuration data file can be accessed that specifies the protocol associated with the communication data.

Data extraction specification identifier 233 is responsible for identifying a data extraction specification (e.g., data extraction specification 242) associated with the communication protocol identified by protocol determiner 232. In various implementations, the data extraction specification can be a stored configuration file that includes communication protocol definitions, locations of features within the protocol, rules specifying features to be extracted from the communication data, and/or transformation instructions to reformat/transform the received data into a normalized format. Notably, the data extraction specification can include the feature definitions for a protocol as well as extraction and transformation rules within the specification itself rather than hard coded into the logic of a component of the gateway feature extraction engine.

In some implementations, the file containing the data extraction specification can be stored using a naming convention that clearly identifies the associated protocol. Alternatively, a cross reference file or database can store information that associates a particular protocol with a particular data extraction specification. In either case, once the protocol has been identified, data extraction specification identifier 233 can identify the appropriate specification file based on the identified protocol. In some implementations, one data extraction specification can be used for any gateway that communicates with the ISP using a particular protocol. Alternatively, separate data extraction specifications can be configured for gateway devices based on device type, ISP vendor, or the like. Thus, the communication data for different gateway devices can be analyzed using different specifications, even though they are communicating with an ISP (or different ISPs) using the same protocol.

In some implementations, the data extraction specification can include the features associated with data communications as defined by the applicable communication protocol. For example, in instances where the communication protocol defines that particular communication features are located at specific offsets within the communication data, the data extraction specification can include the features with their associated offsets. Similarly, in instances where the protocol definition is configured using key/value pairs, the data extraction specification can specify the key/value pair sequences. Additionally, if the protocol specifies particular data formats and feature layouts (e.g., date, time, integer, string, etc.), the data extraction specification can include this information as well.

As noted above, the data extraction specification can also include instructions specifying particular features of the communication protocol to extract from the communication data received by communication data receiver 231. For example, if the ISP identifies particular features of interest included in the communication protocol that could be useful in monitoring the gateway device for potential problems, those features can be included in the data extraction specification. By selecting particular features of interest to extract, gateway feature extraction manager 230 target the particular features for further analysis/tracking rather than storing the entire data stream for the communications with the gateway device. Notably, by specifying the particular features of interest to be extracted in the data extraction specification, subsequent modifications to the extraction process can be made by updating the configuration file containing the data extraction specification, rather than modifying the logic of the gateway feature extraction manager 230 itself.

Also as noted above, the data extraction specification can include instructions that define data normalization/transformation operations to be performed on any extracted features. For example, in instances where a date/timestamp is included in the protocol in a particular format, the data extraction specification can include instructions to format date fields in a different format that can be used by the ISP for analysis. Similarly, if an email address is included in the protocol, the data extraction specification can include instructions to extract the domain portion of the email address, the username of the email address, or the like. As with the extraction rules, subsequent modifications to the transformation instructions can be made by updating the configuration file containing the data extraction specification, rather than modifying the logic of the gateway feature extraction manager 230 itself. In various implementations, the transformation instructions can be defined as executable instructions that can be performed by data transformation module 236 below.

Communication data analyzer 234 is responsible for analyzing the communication data received by communication data receiver 231 using the data extraction specification identified by data extraction specification identifier 233. In various implementations, communication data analyzer 234 can parse the received communication data according to the protocol format/layout that is included in the data extraction specification. Additionally, communication data analyzer 234 can execute the instructions specified in the data extraction specification to identify the features of interest selected for extraction from the communication data and perform any specified transformation/formatting operations included on those features.

In some implementations, the instructions in the data extraction specification can direct communication data analyzer 234 to extract one or more specific communication features from the communication data. In such instances, communication data analyzer 234 can identify an instruction in the data extraction specification, and determine that the data extraction specification instruction selects one or more specific communication features of the protocol for the communication connection. Communication data analyzer 234 can then identify the specific communication features of interest in the communication data specified by the specification, and extract the specific feature (or features) from the communication data.

For example, in implementations where the protocol is defined using key/value pairs, the data extraction specification can identify the feature(s) to be extracted by specifying the applicable key/value pair(s). Communication data analyzer 234 can identify the target key/value pairs(s) based on the data extraction specification, parse for those specific key/value pair(s) in the communication data, extract the appropriate features from the communication data. Alternatively, in implementations where the protocol is defined such that features are included at particular offsets within the communication data or with particular field names or labels within the communication data, the data extraction specification can identify the feature(s) to be extracted by specifying the applicable offset or field name/label.

In other implementations, the data extraction specification can identify the feature(s) to be extracted based on the order in which the features occur in the communication data. In such instances, communication data analyzer 234 can parse the data in the communication stream and select features for extraction based on the chronological order of the features. For example, the data extraction specification can specify that the first, third, and fifth feature be extracted. Communication data analyzer 234 can parse the data to identify the communication features in the data based on the protocol definitions without searching for specific key/value pairs or labels. The first, third, and fifth features can be extracted regardless of what those features actually are. Thus, the configuration file can be structured such that additional features can be extracted by modifying the chronological order number specified in the data extraction specification.

In some implementations, the instructions in the data extraction specification can direct communication data analyzer 234 to extract a range communication features from the communication data. In such instances, communication data analyzer 234 can identify an instruction in the data extraction specification, and determine that the data extraction specification instruction selects a range of communication features of the protocol for the communication connection. Communication data analyzer 234 can then identify the range of communication features of interest in the communication data specified by the instruction in the specification, and extract the range of features from the communication data.

In some implementations, communication data analyzer 234 can identify the range based on a starting point and an ending point in the communication data based on the protocol definition in the data extraction specification. For example, the specification can indicate a particular feature to be the starting point of the range, and an additional feature to be the ending point of the range. Communication data analyzer 234 can identify the starting point feature as well as the end point of the range in the communication data. Once these features are identified in the communication data, communication data analyzer 234 can select for extraction the starting point feature, the ending point feature, and all features in the communication data between those two features. Data extraction module 235 can then be invoked to perform the data extraction.

In some implementations, communication data analyzer 234 can identify the range based on a starting point and a number of features to select. For example, the specification can indicate a particular feature to be the starting point of the range, and a number (e.g., an integer value) of features included in the range. Communication data analyzer 234 can then identify the starting point feature, then select for extraction the starting point feature and the number of features in the communication data specified by the range value. Alternatively, communication data analyzer 234 can then identify the starting point feature, then select for extraction the number of features in the communication data specified by the range value. In this latter case, the starting point feature is excluded from the extraction and only the number of features specified by the specification that occur after the starting point are extracted. Data extraction module 235 can then be invoked to perform the data extraction.

In some implementations, the data extraction specification can identify the feature(s) to be extracted based on the order in which the features occur in the communication data. In such instances, communication data analyzer 234 can parse the data in the communication stream and select features for extraction based on the chronological order of the features. For example, the data extraction specification can specify features one through five be extracted. Communication data analyzer 234 can parse the data to identify the communication features in the data based on the protocol definitions without searching for specific key/value pairs or labels. The first five features can be extracted regardless of what those features actually are. Thus, the configuration file can be structured such that range of features to be extracted can be updated by modifying the feature number range specified in the data extraction specification. Data extraction module 235 can then be invoked to perform the data extraction.

Data extraction module 235 is responsible for generating extracted data (e.g., extracted data 251) based on the analysis performed by communication data analyzer 234. In various implementations, the extracted data includes the communication feature or features specified in the data extraction specification. Once the applicable features have been extracted from the communication data (and transformed/reformatted if applicable), data extraction module 235 can invoke data storage module 238 to store the extracted data 251 to a data store. In various implementations, the extracted data 251 can be subsequently analyzed using additional metrics to proactively identify potential error conditions as well as perform analysis of previously occurring error conditions.

Data transformation module 236 is responsible for performing transformation (reformatting, normalization, etc.) operations on the data selected for extraction. As noted above, the instructions in the data extraction specification can direct data transformation module 236 to perform data normalization/transformation operations on the features to be extracted from the communication data. Data transformation module 236, upon encountering transformation instructions applicable to the features selected for extraction, can perform the transformation on those features in the communication data to generate the reformatted data that is extracted and stored. In various implementations, data transformation module 236 may be invoked by data extraction module 235 as it extracts the features that are identified by communication data analyzer 234. Data transformation module 236 can perform the transformation operations before storing the data. Alternatively, data transformation module 236 can perform the transformation operations on the extracted operations after they are stored.

In some implementations, data transformation module 236 can include a default component (e.g., a method, object, class, procedure, etc.) to be performed on a feature to be extracted. In such instances, the data extraction specification can include executable instructions that can be executed by this default component. Alternatively, any instructions included in the data extraction specification can be interpreted by data transformation module 236 as overriding (or "overloading") the default component. In this latter instance, data transformation module 236 will replace the default component with the instructions in the data extraction specification. Once the transformation operations have been completed, the transformed data can be extracted and stored (or can replace any stored extracted data if applicable).

As noted above, data storage module 238 is responsible for storing the extracted and/or transformed data. In various implementations the data can be stored in a memory area, a local data storage device, a big data database, or the like. The stored data can then be utilized by other components of the WAN accessible service for additional analysis, reporting, etc. In some instances, the stored data can be used as a source for machine learning (ML) or artificial intelligence (AI) models associated with the WAN accessible service. In some instances, the stored data can be used by error detection module 237 as described below.

Error detection module 237 is responsible for utilizing the extracted data to determine if a potential error condition is present in the communication data received from the gateway device. In some instances, error detection module 237 can receive the extracted data directly from data extraction module 235 (or data transformation module 236) as it is processed. In such instances, error detection module 237 can invoke data storage module 238 to store the extracted data in a data store of extracted data (stored extracted data 243) if the extracted data has not already been stored. Alternatively, error detection module 237 can analyze the extracted data after it has been stored (stored extracted data 243).

Error detection module 237 can subsequently analyze the newly extracted data based on information stored in the stored extracted data. For example, the error detection module 237 can compare the newly extracted features to the stored data to determine if the new data is similar to stored data where errors were detected. In various implementations, the stored data can be analyzed using ML/AI models that are configured to identify data features that indicate potential error conditions present in the gateway device. Similarly, the stored data can be analyzed to identify features in the communication data that, may indicate that an error condition is imminent for the gateway device. For example, features in the communication data could indicate data corruption, packet loss, network slow down, etc. that, while not currently impacting the gateway device, could cause an error condition in the gateway device at a later time. Error detection module 237 can analyze the newly extracted data using these types of patterns to determine if the newly extracted data indicates the presence of an error condition for the gateway device, or a potential error condition for the gateway device at some future time.

Responsive to determining that the extracted data does indicate the presence of an error condition (or potential future error condition), error detection module 237 can perform an error correction action associated with the gateway device. In some implementations, error detection module 237 can perform the error correction action by generating an alert notification that includes information associated with the error condition and sending the alert to the ISP. The alert can be an email message, a text message (e.g., SMS message), an alert notification to an administrator console, or the like. The notification can include information describing the error, an error code, the extracted features, information that identifies the gateway device, or the like.

In some implementations, error detection module 237 can perform the error correction action by generating a notification that includes one or more instructions that can be executed by the gateway device to correct the error condition. For example, if the detected error indicates that the gateway device should be restarted (e.g., rebooted), error detection module 237 can generate a notification to be sent to the gateway device (or a secondary device connected to the gateway device) that includes instructions, that when executed by the gateway device, cause the gateway device to restart itself (or restart the secondary device connected to the gateway device).

In various implementations, the above process can be repeated for subsequently received communication data. Thus, any newly received communication data from the same gateway device (or other gateway devices that are associated with the same set of data extraction specification rules) can be processed as described above. Notably, any modifications to the features of interest to be extracted from subsequently received communication data can be made by modifying the data extraction specification file rather than reconfiguring/recoding/redeploying the gateway feature extraction manager 230 itself.

In such instances, the WAN accessible service 200 can receive a request specifying an additional communication feature to be extracted from subsequent communication data associated with the connection between the gateway device and the ISP. The request can be received from a user interface for the WAN accessible service that provides the ability to update the data extraction specification directly. Alternatively the request can be from another component of the WAN accessible service that indicates that a new data extraction specification file is available, along with the file's location. The WAN accessible service can generate a modified data extraction specification that includes the additional feature to be extracted, and utilize the modified specification for subsequently received communication data. Any subsequently received communication data from the gateway device can be processed by gateway feature extraction manager 230 as described above using the modified data extraction specification.

In some implementations, the gateway feature extraction manager 230 can be configured to manage a single communication connection, multiple connections for a single protocol, multiple connections for a single ISP, etc. In such cases, may instances of the gateway feature extraction manager 230 can execute within the WAN accessible service where each instance utilizes a particular data extraction specification. Alternatively, a single instance of the gateway feature extraction manager 230 can be provisioned to service multiple connections, ISPs, and protocols using separate data extraction specification files. Notably, the gateway feature extraction manager 230 can be configured to be protocol agnostic, utilizing the information stored in the data extraction specification to drive the extraction process described above.

In instances where a single instance of gateway feature extraction manager 230 is used, additional communication data can be received and processed according to any data extraction specification with which the communication connection that provided the data is associated. Upon receiving the additional communication data, gateway feature extraction manager 230 can determine the protocol associated with the connection, identify the particular data extraction specification that is associated with the protocol for that connection, analyze the data using that specification, and extract any identified features accordingly.

Figure 3:
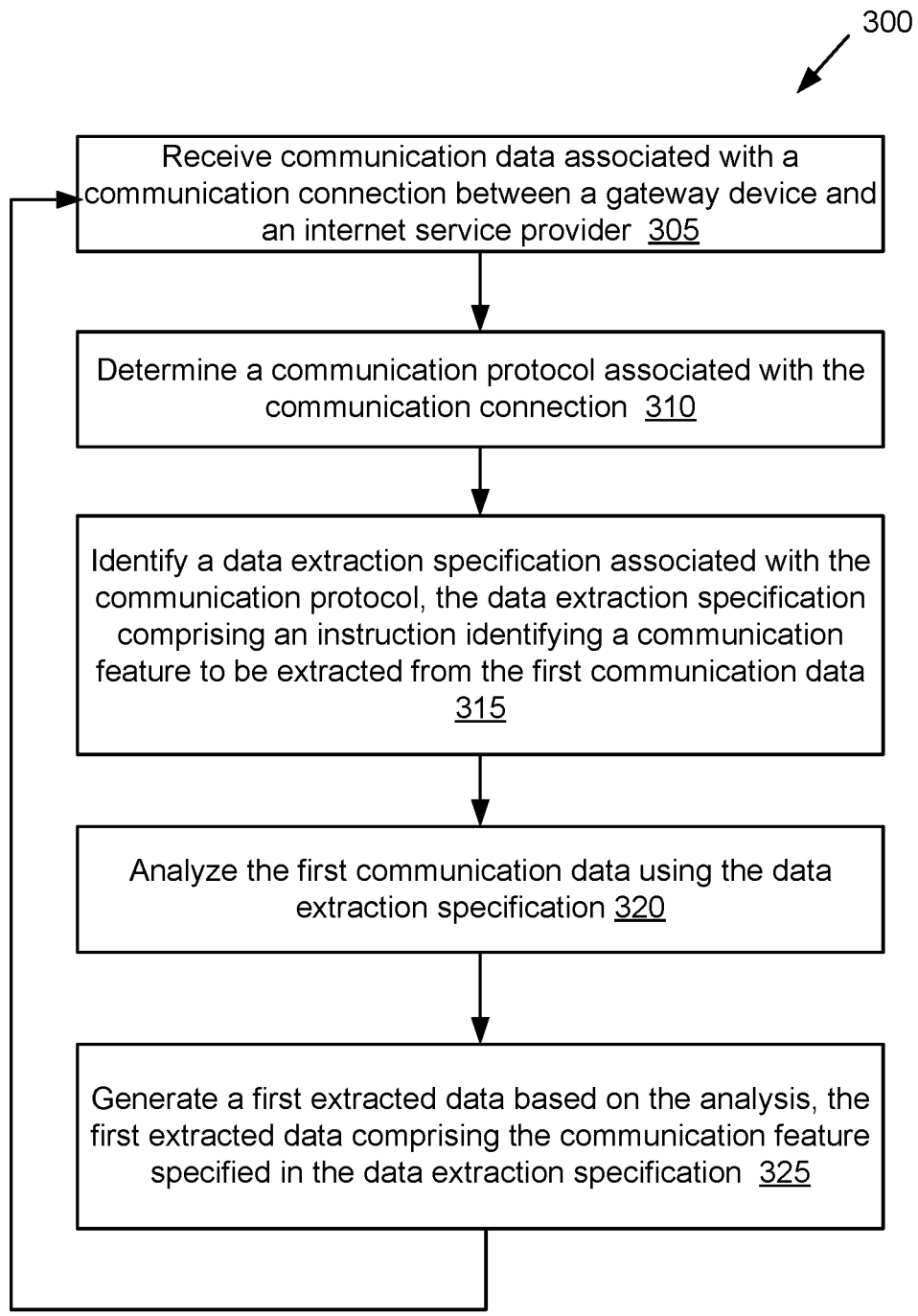
FIG. 3 is a flow chart of an example method for implementing a framework for gateway feature extraction, in accordance with some embodiments of the present disclosure.

FIG. 3 is a flow diagram of a method 300 for implementing a framework for gateway feature extraction. The method 300 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 300 are performed by gateway feature extraction manager 130 of FIG. 1 and/or gateway feature extraction manager 230 of FIG. 2.

At block 305 of method 300, processing logic receives a first communication data associated with a communication connection between a gateway device and an internet service provider. At block 310, processing logic determines a communication protocol associated with the communication connection, where the communication protocol comprises a plurality of communication features. At block 315, processing logic identifies a data extraction specification associated with the communication protocol, the data extraction specification comprising an instruction identifying a first communication feature of the plurality of communication features to be extracted from the first communication data.

At block 320, processing logic analyzes the first communication data using the data extraction specification. In various implementations, the instructions in the data extraction specification can direct the processing logic to select a specific feature for extraction or a range of features for extraction. An example method for extracting a specific feature is described below with respect to FIG. 4. An example method for extracting a range of features is described below with respect to FIG. 5. In some implementations, the data extraction specification can direct the processing logic to perform a transformation operation on a selected feature. An example method for this process is described below with respect to FIG. 6.

At block 325, processing logic generates a first extracted data based on the analysis, the first extracted data comprising the first communication feature specified in the data extraction specification. Processing can return to block 305 to process any additional communication received.

Figure 4:
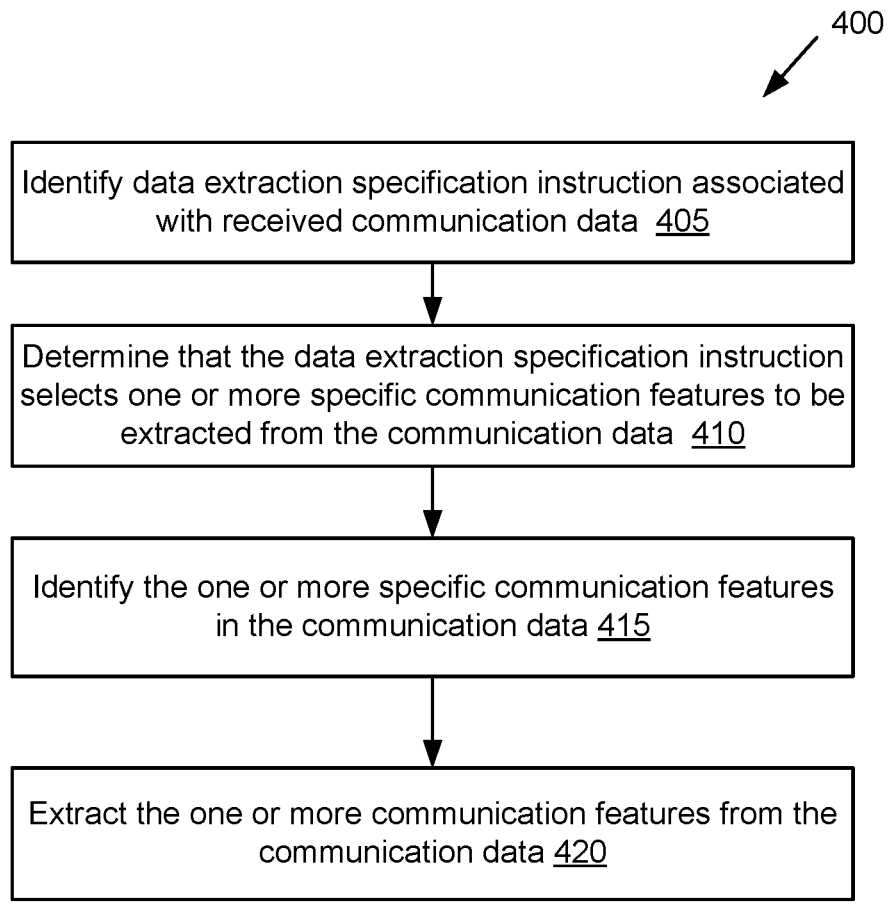
FIG. 4 is a flow chart of an example method for extracting a particular feature from communication data associated with a connection between a gateway device and an ISP, in accordance with some embodiments of the present disclosure.

FIG. 4 is a flow diagram of a method 400 for extracting a particular feature from communication data associated with a connection between a gateway device and an ISP. The method 400 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 400 are performed by gateway feature extraction manager 130 of FIG. 1 and/or gateway feature extraction manager 230 of FIG. 2.

At block 405 of method 400, processing logic identifies a data extraction specification instruction associated with received communication data. Processing logic can perform this identification as described above with respect to FIG. 2. At block 410, processing logic determines that the data extraction specification instruction selects one or more specific communication features to be extracted from the received communication data. At block 415, processing logic identifies the one or more specific communication features in the first communication data. At block 420, processing logic extracts the one or more communication features from the received communication data.

Figure 5:
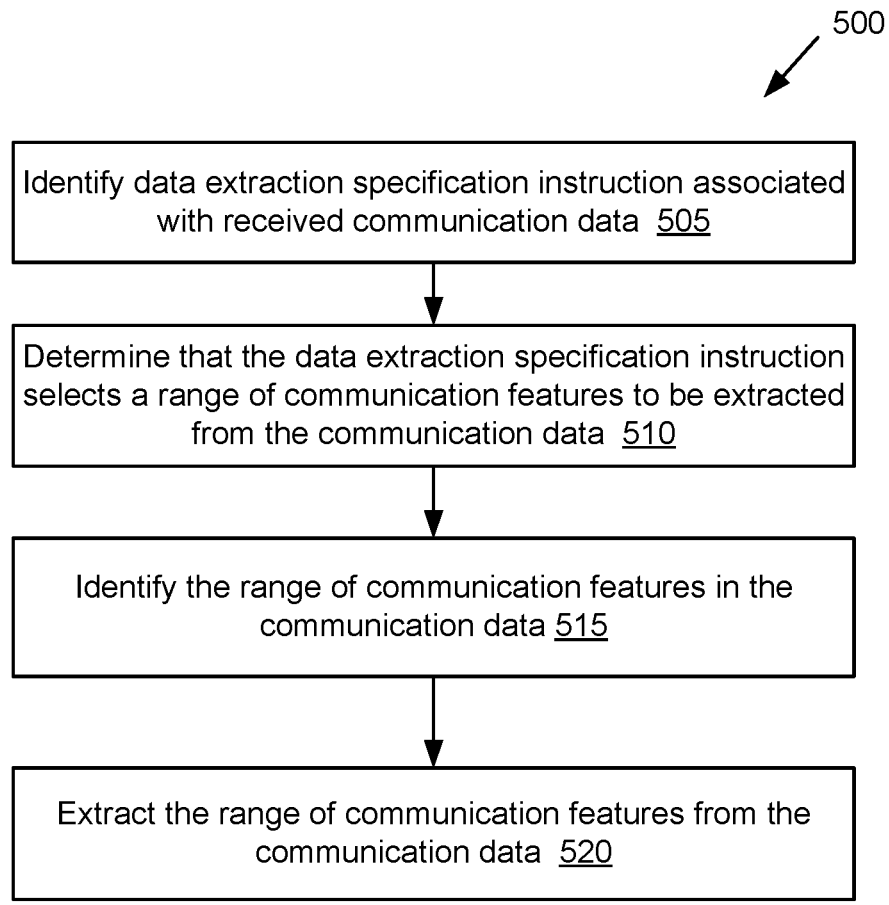
FIG. 5 is a flow chart of an example method for extracting a range of features from communication data associated with a connection between a gateway device and an ISP, in accordance with some embodiments of the present disclosure.

FIG. 5 is a flow diagram of a method 500 for extracting a range of features from communication data associated with a connection between a gateway device and an ISP. The method 500 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 500 are performed by gateway feature extraction manager 130 of FIG. 1 and/or gateway feature extraction manager 230 of FIG. 2.

At block 505 of method 500, processing logic identifies a data extraction specification instruction associated with received communication data. Processing logic can perform this identification as described above with respect to FIG. 2. At block 510, processing logic determines that the data extraction specification instruction selects a range of communication features to be extracted from the received communication data. At block 515, processing logic identifies the range of communication features in the received communication data. At block 420, processing logic extracts the range of communication features from the received communication data.

Figure 6:
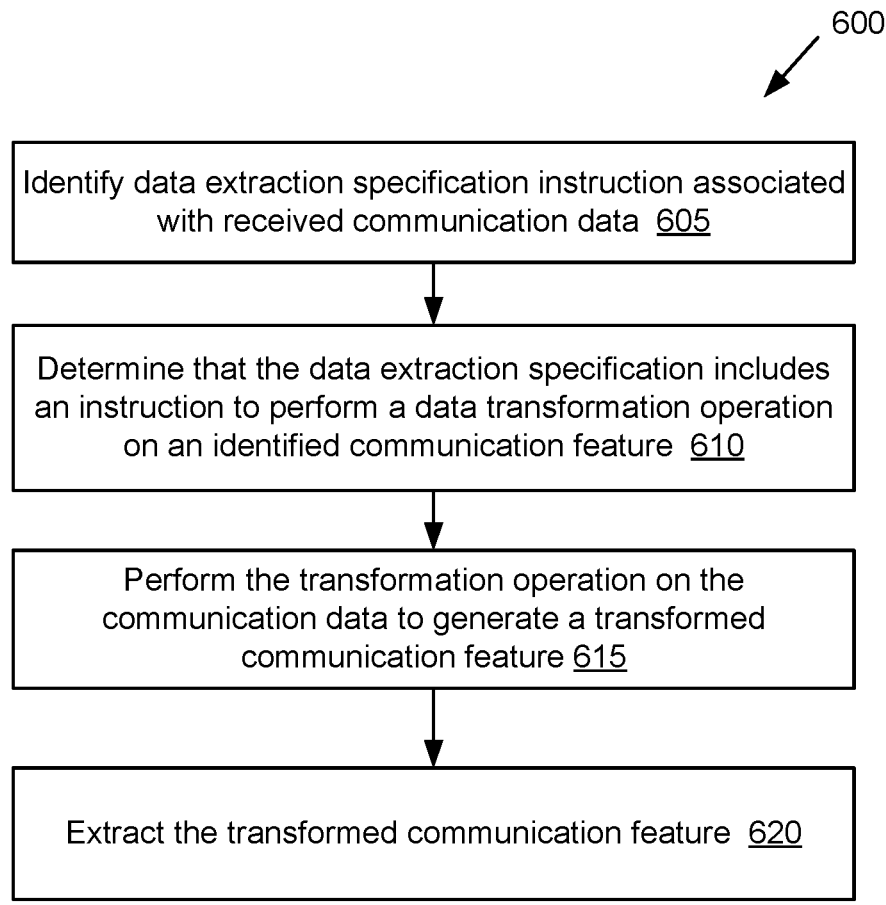
FIG. 6 is a flow chart of an example method for performing a transformation operation on a selected communication feature, in accordance with some embodiments of the present disclosure.

FIG. 6 is a flow diagram of a method 600 for performing a transformation operation on a selected communication feature. The method 600 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 600 are performed by gateway feature extraction manager 130 of FIG. 1 and/or gateway feature extraction manager 230 of FIG. 2.

At block 605 of method 600, processing logic identifies a data extraction specification instruction associated with received communication data. Processing logic can perform this identification as described above with respect to FIG. 2. At block 610, processing logic determines that the data extraction specification includes an instruction to perform a data transformation operation on an identified communication feature. At block 615, processing logic performs the transformation operation specified in the instruction on the identified communication feature to generate a transformed communication feature. At block 620, processing logic extracts the transformed communication feature.

Figure 7:
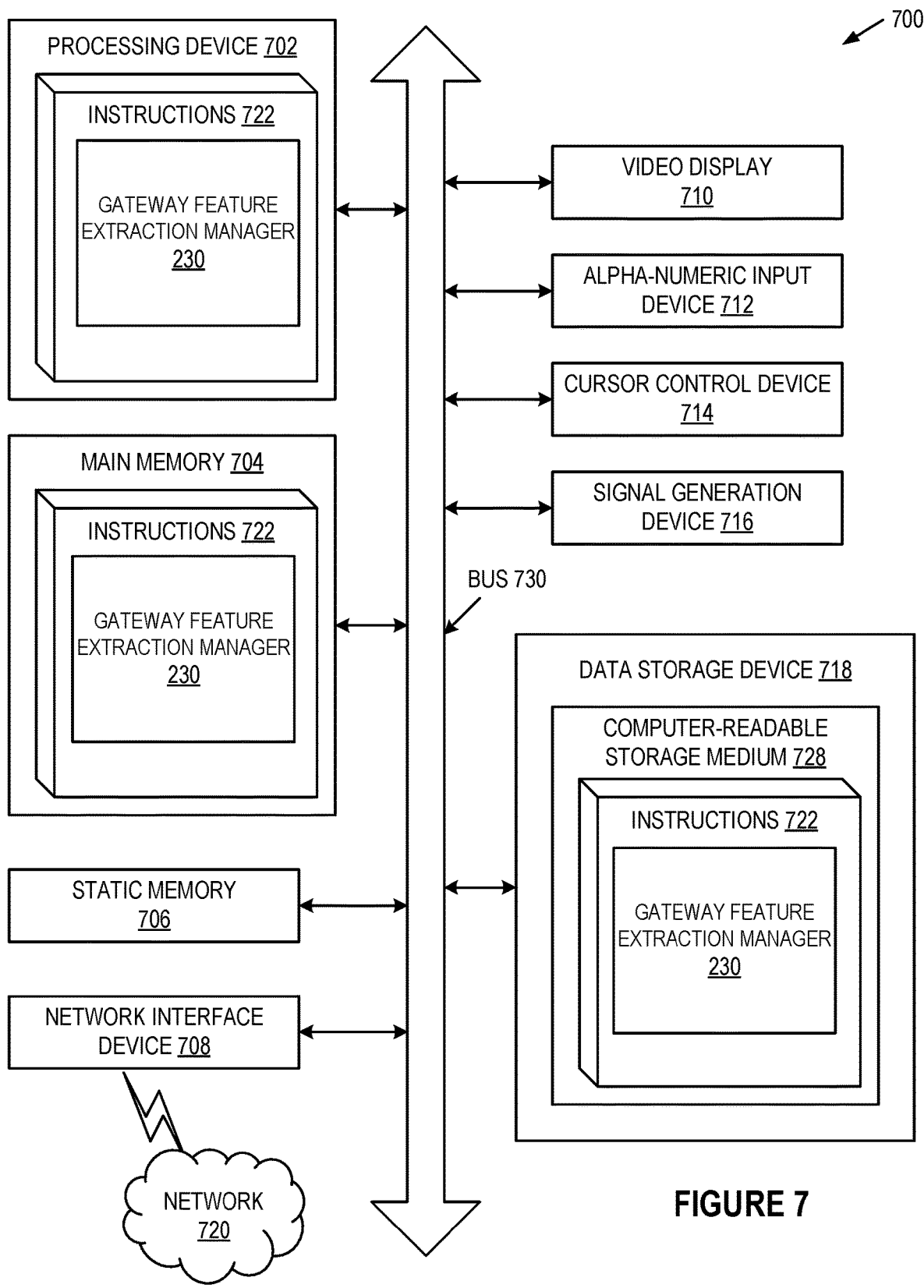
FIG. 7 illustrates a block diagram of an example computing device in which embodiments of the present disclosure may operate.

FIG. 7 illustrates a diagrammatic representation of a machine in the example form of a computing device 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory (e.g., a data storage device 718), which communicate with each other via a bus 730.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the processing logic (instructions 722) for performing the operations and steps discussed herein.

The computing device 700 may further include a network interface device 808. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium (or more specifically a computer-readable storage medium) 728 on which is stored one or more sets of instructions 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting computer-readable storage media.

The computer-readable storage medium 728 may also be used to store a gateway feature extraction manager 230 (as described with reference to FIG. 2), and/or a software library containing methods that call a gateway feature extraction manager 230. While the computer-readable storage medium 728 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "identifying", "determining", "selecting", "analyzing", "generating", "performing", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a processing device, first communication data associated with a communication connection between a gateway device and an internet service provider;
   determining a communication protocol associated with the communication connection, wherein the communication protocol comprises a plurality of communication features;
   identifying a data extraction specification associated with the communication protocol, the data extraction specification comprising an instruction identifying a communication feature of the plurality of communication features to be extracted from the first communication data;
   analyzing the first communication data using the data extraction specification;
   generating a first extracted data based on the analysis, wherein the first extracted data comprises a subset of the received first communication data corresponding to the first communication feature specified in the data extraction specification;
   identifying, by providing the first extracted data as input to a machine learning model trained to identify data features that indicate potential errors in the gateway device, a potential future error in the gateway device; and
   sending, to the internet service provider, an alert notification comprising information associated with the potential future error in the gateway device.

2. The method of claim 1, further comprising:
   receiving a request specifying a second communication feature of the plurality of communication features to be extracted from subsequent communication data associated with the communication connection between the gateway device and the internet service provider; and
   generating a modified data extraction specification associated with the communication protocol, the modified data extraction specification comprising the second communication feature.

3. The method of claim 2, further comprising:
   receiving second communication data associated with the communication connection between the gateway device and the internet service provider;
   analyzing the second communication data using the modified data extraction specification; and
   generating a second extracted data based on the analysis, the second extracted data comprising the second communication feature specified in the modified data extraction specification.

4. The method of claim 1, further comprising:
   receiving second communication data associated with a second communication connection between a second gateway device and the internet service provider;
   determining a second communication protocol associated with the second communication connection, wherein the second communication protocol comprises a second plurality of communication features;
   identifying a second data extraction specification associated with the second communication protocol, the second data extraction specification comprising a second communication feature of the second plurality of communication features to be extracted from the second communication data;
   analyzing the second communication data using the second data extraction specification; and
   generating a second extracted data based on the analysis, the second extracted data comprising the first communication feature specified in the second data extraction specification.

5. The method of claim 1, wherein analyzing the first communication data using the data extraction specification comprises:
   determining that the data extraction specification instruction selects one or more specific communication features of the plurality of communication features;
   identifying the one or more specific communication features in the first communication data; and
   extracting the one or more specific communication features from the first communication data, the one or more specific communication features comprising the first communication feature.

6. The method of claim 1, wherein analyzing the first communication data using the data extraction specification comprises:

determining that the data extraction specification instruction selects a range of communication features of the plurality of communication features;
identifying the range of communication features in the first communication data; and
extracting the range of communication features from the first communication data, the range of communication features comprising the first communication feature.

7. The method of claim 1, wherein analyzing the first communication data using the data extraction specification comprises:
determining that the data extraction specification further comprises a second instruction to perform a data transformation operation on the first communication feature;
performing the data transformation operation on the first communication data to generate a transformed first communication feature; and
extracting the first transformed communication feature.

8. The method of claim 1, further comprising:
storing the first extracted data in a data store of extracted data, the data store of extracted data comprising additional extracted data from analysis of additional communication data;
analyzing the first extracted data in view of the additional extracted data in the data store;
determining, based on the analysis, whether the first extracted data indicates a presence of an error condition for the gateway device; and
responsive to determining that the first extracted data indicates the presence of the error condition for the gateway device, performing an error correction action associated with the gateway device.

9. The method of claim 8, wherein performing the error correction action associated with the gateway device comprises:
generating a second alert notification comprising information associated with the error condition; and
sending the second alert notification to the internet service provider.

10. The method of claim 8, further comprising:
generating one or more instructions that when executed by the gateway device correct the error condition;
generating a notification comprising the one or more instructions; and
sending the notification to the gateway device to cause the gateway device to execute the one or more instructions.

11. A system comprising:
a server computing device comprising:
a memory; and
a processing device operatively coupled to the memory, the processing device to:
receive first communication data associated with a communication connection between a gateway device and an internet service provider;
determine a communication protocol associated with the communication connection, wherein the communication protocol comprises a plurality of communication features;
identify, based on the communication protocol associated with the communication connection, a data extraction specification comprising an instruction to extract communication feature of the plurality of communication features from the first communication data;
analyze the first communication data using the data extraction specification;
generate a first extracted data based on the analysis, wherein the first extracted data comprises a subset of the received first communication data corresponding to the first communication feature specified in the data extraction specification; and
identify, by providing the first extracted data as input to a machine learning model trained to identify data features that indicate potential errors in the gateway device, a potential future error in the gateway device.

12. The system of claim 11, wherein the processing device is further to:
receive a request specifying a second communication feature of the plurality of communication features to be extracted from subsequent communication data associated with the communication connection between the gateway device and the internet service provider;
generate a modified data extraction specification associated with the communication protocol, the modified data extraction specification comprising the second communication feature;
receive second communication data associated with the communication connection between the gateway device and the internet service provider;
analyze the second communication data using the modified data extraction specification; and
generate a second extracted data based on the analysis, the second extracted data comprising the second communication feature specified in the modified data extraction specification.

13. The system of claim 11, wherein to analyze the first communication data using the data extraction specification, the processing device is further to:
determine that the data extraction specification instruction selects one or more specific communication features of the plurality of communication features;
identify the one or more specific communication features in the first communication data; and
extract the one or more specific communication features from the first communication data, the one or more specific communication features comprising the first communication feature.

14. The system of claim 11, wherein to analyze the first communication data using the data extraction specification, the processing device is further to:
determine that the data extraction specification instruction selects a range of communication features of the plurality of communication features;
identify the range of communication features in the first communication data; and
extract the range of communication features from the first communication data, the range of communication features comprising the first communication feature.

15. The system of claim 11, wherein to analyze the first communication data using the data extraction specification, the processing device is further to:
determine that the data extraction specification further comprises a second instruction to perform a data transformation operation on the first communication feature;
perform the data transformation operation on the first communication data to generate a transformed first communication feature; and
extract the first transformed communication feature.

16. A non-transitory computer readable storage medium having instructions that, when executed by a processing device, cause the processing device to perform operations comprising:

receiving, by the processing device, first communication data associated with a communication connection between a gateway device and an internet service provider;

determining a communication protocol associated with the communication connection, wherein the communication protocol comprises a plurality of communication features;

identifying a data extraction specification associated with the communication protocol, the data extraction specification comprising an instruction identifying a first communication feature of the plurality of communication features to be extracted from the first communication data;

analyzing the first communication data using the data extraction specification;

generating a first extracted data based on the analysis, wherein the first extracted data comprises a subset of the received first communication data, wherein the subset corresponds to the first communication feature specified in the data extraction specification;

identifying, by providing the first extracted data as input to a machine learning model trained to identify data features that indicate potential errors in the gateway device, a potential future error in the gateway device; and sending, to the internet service provider, an alert notification comprising information associated with the potential future error in the gateway device.

17. The non-transitory computer readable storage medium of claim 16, the operations further comprising:

receive a request specifying a second communication feature of the plurality of communication features to be extracted from subsequent communication data associated with the communication connection between the gateway device and the internet service provider;

generate a modified data extraction specification associated with the communication protocol, the modified data extraction specification comprising the second communication feature;

receive second communication data associated with the communication connection between the gateway device and the internet service provider;

analyze the second communication data using the modified data extraction specification; and generate a second extracted data based on the analysis, the second extracted data comprising the second communication feature specified in the modified data extraction specification.

18. The non-transitory computer readable storage medium of claim 16, wherein analyzing the first communication data using the data extraction specification comprises:

determine that the data extraction specification instruction selects one or more specific communication features of the plurality of communication features;

identify the one or more specific communication features in the first communication data; and extract the one or more specific communication features from the first communication data, the one or more specific communication features comprising the first communication feature.

19. The non-transitory computer readable storage medium of claim 16, wherein analyzing the first communication data using the data extraction specification comprises:

determine that the data extraction specification instruction selects a range of communication features of the plurality of communication features;

identify the range of communication features in the first communication data; and extract the range of communication features from the first communication data, the range of communication features comprising the first communication feature.

20. The non-transitory computer readable storage medium of claim 16, wherein analyzing the first communication data using the data extraction specification comprises:

determine that the data extraction specification further comprises a second instruction to perform a data transformation operation on the first communication feature;

perform the data transformation operation on the first communication data to generate a transformed first communication feature; and extract the first transformed communication feature.

* * * * *